United States Patent [19]

Breault et al.

[11] 4,374,906
[45] Feb. 22, 1983

[54] RIBBED ELECTRODE SUBSTRATES

[75] Inventors: Richard D. Breault, Coventry, Conn.; Glen J. Goller, West Springfield, Mass.

[73] Assignee: United Technologies Corporation, Hartford, Conn.

[21] Appl. No.: 306,835

[22] Filed: Sep. 29, 1981

[51] Int. Cl.³ .................... H01M 4/86; H01M 4/96
[52] U.S. Cl. .................................. 429/44; 429/36
[58] Field of Search ............... 429/44, 40, 41, 247, 429/249, 35, 36, 185, 237

[56] References Cited

U.S. PATENT DOCUMENTS 4,129,685 12/1978 Damiano ........................ 429/44 X
4,269,642 5/1981 De Casperis et al. ............. 429/44 X Primary Examiner—Anthony Skapars
Attorney, Agent, or Firm—Stephen E. Revis

[57] ABSTRACT

A ribbed substrate for an electrochemical cell electrode is made from a mixture of carbon fibers and carbonizable resin and has a mean pore size in the ribs which is 60–75% of the mean pore size of the web portions of the substrate which interconnect the ribs. Preferably the mean pore size of the web portion is 25–45 microns; and, if the substrate includes edge seals parallel to the ribs, the edge seals preferably have a mean pore size no greater than about ten microns. Most preferably the substrate has the same ratio of carbon fibers to polymeric carbon in all areas, including the ribs, webs, and edge seals. A substrate according to the present invention will have better overall performance than prior art substrates and minimizes the substrate thickness required for the substrate to perform all its functions well.

21 Claims, 7 Drawing Figures

RIBBED ELECTRODE SUBSTRATES

DESCRIPTION

1. Technical Field

This invention relates to fuel cell electrode substrates.

2. Background Art

Electrochemical cells, such as fuel cells for generating electricity, comprise a pair of spaced apart electrodes (an anode and cathode) with an electrolyte saturated matrix disposed therebetween. The electrode includes a substrate having a catalyst layer disposed on the side thereof facing the electrolyte matrix. Channel or passageway means is defined on the other side of the substrate for carrying a reactant gas (fuel or oxidant) through the cell behind the electrode. For example the substrate may include a plurality of spaced apart parallel ribs on the side opposite the catalyst layer whereby channels are defined between the ribs for carrying the reactant gas. Commonly owned U.S. Pat. No. 4,115,627 describes such a substrate.

In general, electrode substrates must satisfy a multitude of functional requirements. For example, it provides a support for the required catalyst layer and means for gaseous reactants to pass therethrough to the catalyst layer. A requirement may also be that it provide an electrolyte storage reservoir to accommodate changes in acid volume due to changes in operating conditions of the cell and due to electrolyte evaporation. The edges of the substrate are often required to function as a wet seal to prevent the escape of reactant gases and electrolyte from the cell. In addition to the foregoing requirements, the substrate must also be a good electrical conductor and a good thermal conductor, and have adequate structural strength and long life.

The art is replete with electrode designs and methods of fabrication having as their objective an electrode or an electrode substrate which satisfies all of the foregoing requirements. While many of these prior art designs perform respectably in all respects and perhaps even excellently in some respects, the designs and fabrication techniques are often complex and costly; and there is considerable room for improvement. For example, above-mentioned U.S. Pat. Nos. 4,115,627 and 4,165,349 describe a ribbed electrode substrate and method for making that substrate. The substrate is molded from a homogeneous mixture comprising 20% phenolic resin and 80%, by weight, carbon fibers having a nominal length of from 10 to 25 mils (the same length is used in the rib and web areas) and a nominal diameter of about 9 microns. The molded, carbonized part has a porosity of approximately 90% in the ribs and 65% in the web areas connecting the ribs. After carbonization the part is wetproofed in select areas by impregnation with polytetrafluoroethylene (PTFE) in order to control the storage and distribution of electrolyte therein and to assure the free passage of reactant gas therethrough to the catalyst layer. Selective wetproofing is costly and not totally effective. Note that although the webs are supposed to provide a low resistance path for reactant gas to reach the catalyst layer, and the ribs are to provide storage for excess electrolyte liquid, the webs have less porosity and therefore a smaller mean pore size than the ribs and thus a higher resistance to mass transfer than the ribs.

A non-ribbed substrate design which may not require any wetproofing is described in commonly owned U.S. Pat. No. 4,035,551. Edge seals with a mean pore size of between 1.0 and 5.0 microns were formed by impregnating the edges with electrolyte matrix material. That patent teaches a substrate which, prior to impregnation of the edges, has a range of pore sizes "randomly distributed throughout" with substantially no pores smaller than the largest pores of the matrix. Substrates with a mean pore size of anywhere from 14 to 83 microns (exclusive of the edge seals) were indicated as being satisfactory.

Commonly owned U.S. Pat. No. 4,129,685 describes a non-ribbed substrate which is selectively wetproofed and which is formed of two separate layers: a fine pore layer facing the electrolyte and onto which the catalyst layer is deposited, and a thicker larger pore layer behind the fine pore layer.

Commonly owned U.S. Pat. No. 4,080,413 describes the fabrication of porous, flat sheet electrode substrates made from "felted" acrylic fibers. The specification discusses the known fact that the porosity of the finished sheet depends upon the compacting pressure used to mold the sheets; and mean pore size as well as density of the sheet varies with porosity. The indicated preferred porosity range is 55 to 65%.

Commonly owned U.S. Pat. No. 5,115,528 describes a method for fabricating a resin bonded carbon fiber electrode substrate having a uniform porosity of 85% and mean pore size of 72 microns throughout. It indicates that carbon fibers on the order of 0.100 inch are preferred. The same length fibers are used throughout the substrate, which has uniform properties throughout.

Commonly owned U.S. Pat. No. 4,269,642 also describes a substrate with ribs, webs and seals all made from the same molding compound. Reactant gas channels are cut out of the substrate, and thus the ribs and webs have identical properties of 20–40 micron mean pore size and 75% porosity. Selective wetproofing may, therefore, be required to control electrolyte storage therein. The edge seals have a mean pore size in one example of 7.6 microns.

Other prior art patents in the field of electrode substrates which may be of interest are: U.S. Pat. Nos. 4,175,055; 4,185,145; 4,125,676; 4,038,463 and 4,064,322. Substrate wet seals are described in detail in commonly owned U.S. Pat. Nos. 3,855,002 and 3,867,206.

A careful review of the above-discussed prior art shows many different approaches to the design and fabrication of electrode substrates none of which have been totally satisfactory in view of less than optimum pore size relationships between various portions of the substrate which in certain respects, must function differently from each other.

DISCLOSURE OF INVENTION

An object of the present invention is a ribbed fuel cell electrode substrate having improved properties.

According to the present invention, an electrochemical cell electrode substrate made from a mixture of carbon fibers and carbonizable resin has parallel ribs on one side thereof and is flat on the other side, the ribs having a mean pore size significantly less than that of the web portion of the substrate which interconnects the ribs. In a preferred embodiment the substrate includes edge seals parallel to the ribs, integral with the web portion, and having a mean pore size significantly less than the ribs.

A substrate according to the present invention will have better overall performance than prior art substrates which, at best have ribs and web portions with identical properties. With the various portions of the substrate having the pore size relationships set forth above, excess cell electrolyte liquid volume will first be drawn into the edge seals, which have a mean pore size not less than that of the electrolyte matrix, and must always remain saturated. The next strongest capillary action is in the ribs, which store and give up electrolyte liquid to the matrix as the liquid volume fluctuates during cell operation. The web portion of the substrate has the largest pores which will remain essentially empty unless the excess electrolyte liquid volume exceeds the storage capacity of the ribs. The ribs are preferably sized to prevent this occurrence. By remaining empty, the web portion provides a reactant gas path to the catalyst layer having less resistance than the prior art and provides a more uniform distribution of the reactant gas over the entire catalytically active portion of the electrode. One advantage of the substrates according to the present invention is the elimination of the need for selective wetproofing to control electrolyte distribution and movement within the substrate, although wetproofing is not prohibited.

Other less critical, but nevertheless important physical characteristics and relationships between the webs, ribs, and edge seals are discussed in more detail hereinbelow under "Best Mode For Carrying Out The Invention."

The foregoing and other objects, features and advantages of the present invention will become more apparent in the light of the following detailed description of the preferred embodiment thereof as shown in the accompanying drawing.

BEST MODE FOR CARRYING OUT THE INVENTION

Figure 1:
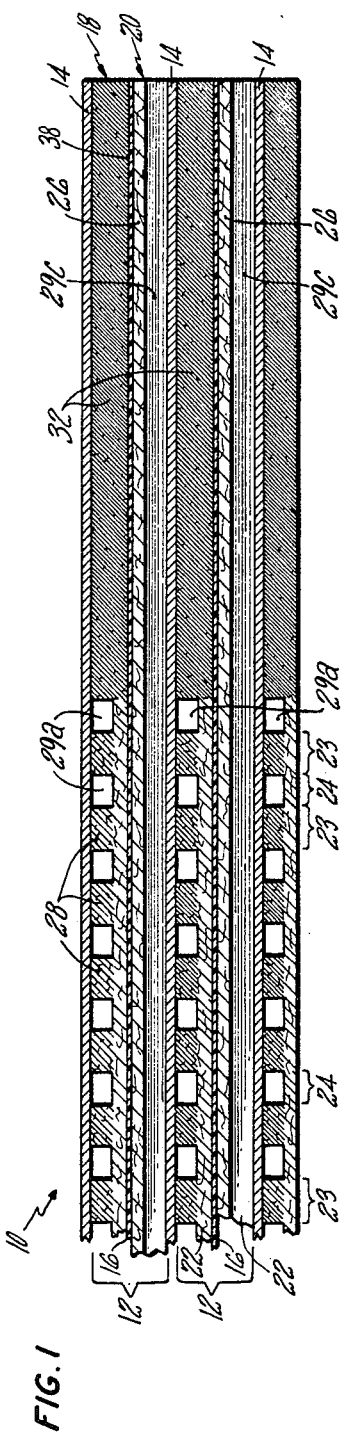
FIG. 1 is a cross-sectional view of part of a fuel cell stack incorporating the electrode substrates of the present invention.
Figure 2:
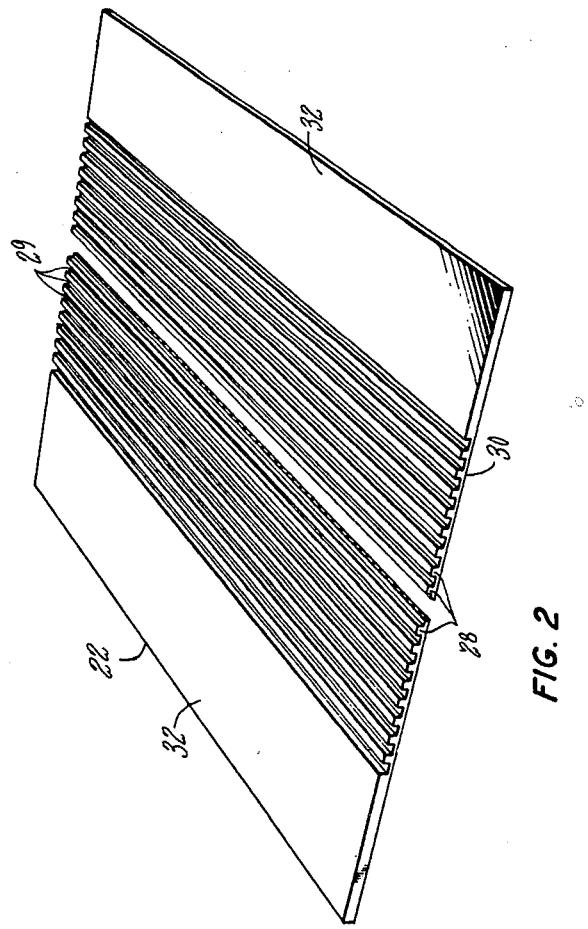
FIG. 2 is a perspective view of one of the substrates from the stack of FIG. 1.

FIG. 1 is a cross-sectional view of part of a fuel cell stack 10. Each stack 10 is comprised of a plurality of fuel cells 12 separated by flat, gas impermeable separator plates 14. The plates 14 may be made by any known method and of any material which is compatible with and can withstand the operating environment within the cell. Each cell 12 includes a porous electrolyte retaining matrix layer 16 with an anode electrode 18 disposed on one side thereof and a cathode electrode 20 disposed on the other side thereof. If phosphoric acid is the electrolyte, the matrix layer 16 is preferably a mixture of silicon carbide and a binder such as polytetrafluoroethylene as shown and described in commonly owned U.S. Pat. No. 4,017,664 by R. Breault. The separator plates are preferably graphite. The electrodes 18, 20 are, in this embodiment, identical, although this need not be the case. Each electrode comprises a substrate 22, best shown removed from the cell in FIG. 2, and in enlarged cross section in FIG. 3. In this invention the substrates are a blend of carbon fibers and polymeric carbon, preferably made by molding and then carbonizing dry mixtures of carbon fibers and a carbonizable resin by a process described in more detail hereinbelow. Each substrate 22 comprises a flat sheet 26 of thickness t having parallel, spaced apart ribs 28 of height h extending across one side thereof. The sheet 26 comprises supported webs 23 under the ribs 28 and unsupported webs 24 between ribs. Hereinafter the sheet 26 is sometimes referred to as the web portion 26 of the substrate 22. The ribs 28 and unsupported webs 24 define parallel channels 29 of width w extending across one side of the substrate. When assembled into a cell 12 the ribs 28 of the anode and cathode electrodes are oriented in directions perpendicular to each other. The electrodes each include a thin catalyst layer on the flat surface 30 of the web portion 26; however, for purposes of clarity the catalyst layers are not shown as they are generally only 2 to 5 mils thick, while the substrate is on the order of 60–100 mils thick.

Each substrate 22 includes an edge seal 32 contiguous with each edge of said flat sheet parallel to the ribs 28. The edge seals 32 have a thickness e equivalent to the sum of the thickness t of the web portion 26 and the height h of the ribs, although other configurations may be used. The catalyst layer would be disposed only on the central portion of the surface 30 between the edge seals 32. That central portion is referred to as the electrochemically active portion of the substrate 22.

Referring to FIG. 1, during operation a reactant fuel gas such as hydrogen is carried through the channels 29a of the anode electrode, and air as the oxidant is carried through the channels 29c of the cathode electrode 20. The reactant gases must freely pass through the substrates 22 to the respective catalyst layers of the electrodes and into contact with electrolyte held within the matrix layer 16. Preferably the gas is distributed in as uniform a manner as possible through the unsupported webs 24 and under the ribs 28 through the supported webs 23 over as much of the area of the catalyst layer as possible, in order to maximize cell performance.

It is also required that the edge seals 32 of the substrates 22 remain saturated with electrolyte liquid to provide a seal at all times at the interface 38 between the matrix layer 16 and the edge seal 32 to prevent reactant gas within the channels 29 from leaking out of the cell through the edge of the substrate or between the edge seal 32 and the matrix layer 16.

As is also well known to those skilled in the art, water is a byproduct of the electrochemical reaction, and the volume of electrolyte liquid within a cell will vary depending upon the operational mode of the cell. In addition, electrolyte in excess of the amount which can be held within the matrix may have to be carried by the cell to accommodate electrolyte losses due to evaporation over an extended period of time. The ribs 28 of the substrates 22 are required to store any liquid volume over and above the amount held within the matrix layer and edge seals and to have it readily available for use within the matrix, as required by the cell.

The preferred mean pore sizes of the various regions of the substrate are determined by considerations of electrolyte distribution within the fuel cell and reactant gas leakage from the fuel cell through the edge seals. With regard to electrolyte distribution, one has to consider the distribution within each substrate and the overall distribution throughout the cell itself. As regards the overall distribution, two different phenomenon are at work. One of these phenomenon is the tendency of the cell to pump electrolyte from the cathode substrate through the matrix to the anode substrate by an unexplained mechanism. This pumping must be accomplished against the capillary forces which tend to hold the liquid stationary. A balancing of these forces acting on the electrolyte will result in the cell reaching a state of equilibrium in terms of electrolyte distribution. Poor cell performance results if the electrolyte distribution is not relatively uniform between the two substrates. It was found that two cells, one with substrates having a 30 micron mean pore size (in both the ribs and webs) and the other with substrates having a 48 micron mean pore size, showed significantly different performance stability. The cell with the larger pores showed rapid decay due to excessive electrolyte transfer to the anode. This is shown by the data in the following table as a loss in cell performance and an increase in hydrogen gain with time, for the 48 micron substrate cell. Hydrogen gain is the performance of the cell on pure hydrogen minus the performance of the cell on reformed fuel. There is virtually no loss in performance and no increase in hydrogen gain for the cell having substrates with the 30 micron mean pore size.

TABLE 1

| Mean Pore Size (microns) | Initial Performance @ 200 ASF (mV) | Performance at 200 Hours @ 200 ASF (mV) | Initial $H_2$ Gain (mV) | $H_2$ Gain @ 200 Hours (mV) |
|---|---|---|---|---|
| 30 | 645 | 645 | 24 | 25 |
| 48 | 635 | 590 | 28 | 58 |

Based upon information of this nature, it has been determined that the substrate web mean pore size should be within the range of 25 to 45 microns, most preferably between 25 and 35 microns.

As regards electrolyte distribution within each substrate and between the substrate and the matrix, the liquid in the system will migrate towards and be held within the smallest accessible pores. Thus, the matrix layer 16 preferably has the smallest mean pore size, and the edge seals 32 the next smallest. The edge seals may, however, have the same mean pore size as the matrix layer. The ribs 28 should have the next largest mean pore size because it is desired that excess liquid electrolyte volume (over and above that required by the matrix layer and seals) travel into and be stored within these ribs. Finally, the web portion 26 should have the largest mean pore size, preferably large enough to prevent significant amounts of electrolyte liquid from becoming absorbed therein, so as not to interfere with the uniform diffusion of reactant gas through either the unsupported webs 24 or under the ribs via the supported webs 23. As discussed above, the web portion mean pore size is preferably between 25 and 45 microns, and most preferably between 25 to 35 microns. The rib mean pore size is chosen to minimize pore size overlap between the ribs and the other two zones (webs and seals). This maximizes the quantity of acid which can be stored and extracted from the ribs. Preferably the ribs will have a mean pore size 60–75% of the web mean pore size. Thus, the ribs have a preferred mean pore size of between about 15 and 27 microns. Some overlap between the pore size distributions of the webs and ribs is acceptable as long as the volume of the pores within the ribs which have diameters smaller than the smallest pores of the webs is sufficient to accommodate the maximum expected amount of liquid which needs to be stored in the ribs. If that is not the case, some liquid will necessarily be stored in the webs.

The required mean pore size of the edge seals is set by reactant gas leakage considerations. To prevent leakage the edge seals must always remain saturated with electrolyte liquid. The mean pore size of the edge seals should be less than the mean pore size of the ribs and is preferably no greater than 10 microns. It is most preferred that the edge seals be able to tolerate transient pressure drops thereacross of about 5 psi. To meet that requirement, the maximum mean pore size of the edge seal would need to be about 7.5 microns. The effect of pore size distribution on the quality of an edge seal is discussed in commonly owned U.S. Pat. No. 4,269,642. The electrolyte matrix layer also has a preferred maximum mean pore size of 7.5 microns. The preferred mean pore size of the matrix layer is dictated by the need to prevent gas crossover through the matrix. The smaller the mean pore size, the greater the pressure drop which can be withstood across the matrix without crossover.

As discussed in more detail hereinafter, mean pore size of the substrate is a function of the bulk density of the fibers used to fabricate the substrate. Assuming constant fiber length, mean pore size increases as average fiber diameter increases (for the same molding pressures). Since it is more difficult to obtain the preferred smaller mean pore sizes when using larger diameter fibers, it is preferred that the substrates be fabricated using fibers having an average diameter no greater than 20 microns and most preferably no greater than about 10 microns. The edge seals, which are required to have a very small mean pore size, cannot be made with fibers having an average diameter as great as 20 microns because no matter how large the compressive force used to mold the edge seals, the mean pore size cannot be reduced to a sufficiently low value.

In addition to the foregoing considerations, which are essentially directed to requirements for reactant gas diffusion and electrolyte liquid movement and storage within the electrode substrate of a fuel cell, other physical properties which must be considered in the construction and design of the substrate are strength, electrical resistivity, and thermal conductivity. For example, electrical resistivity must be low and thermal conductivity high. These characteristics are affected by the characteristics of the materials from which the substrate is to be made as well as the fabrication process, including heat treatment. Strength, of course, must be considered not only from the point of view of life expectancy requirements, but also in terms of handleability of the part during fabrication and assembly. Strength requirements may, for example, dictate minimum thickness and maximum porosities. As regards the present invention, satisfactory substrates may be made from mixtures comprising 50–80% carbon fibers and 20–50% carbonizable resin having a carbon yield of at least 40%. The more important consideration is the ultimate composition of the finished (i.e., heat treated) product. Upon carbonization of the molded article a considerable portion of the resin is volatilized, and the remainder is converted to polymeric carbon. The relative amounts of fiber and polymeric carbon affect the above-discussed electrode characteristics. It is preferred that a finished electrode substrate comprise 65–90%, by weight, carbon fiber and 10–35%, by weight, polymeric carbon. Finished substrates comprising 75–85% carbon fibers and 15–25% polymeric carbon have demonstrated superior electrode characteristics, and are therefore most preferred. As further discussed hereinafter, it is preferred that the entire substrate be made from mixtures having the same ratio of fibers to resin. This, in turn, will result in a finished substrate having the same ratio of fibers to polymeric carbon throughout.

Fiber length also has an affect on several of the above-discussed properties and characteristics. For example, short fibers provide lower thru-plane electrical resistivity and higher thru-plane thermal conductivity than longer fibers. It is postulated that structures made from longer fibers (i.e., greater than 20 mils) have most of the fibers oriented in the plane of the substrate, and this results in poorer thru-plane properties. Furthermore, the fiber length should be considerably less than the thinnest sections of the substrate, which may be no more than about 25 mils thick, such as in the unsupported web areas, in order to assure that fibers do not protrude from the surfaces. Carbon fiber length also affects mean pore size, since shorter fibers pack together more closely than longer fibers (assuming the same diameter). Based upon all of these considerations and especially the preferred mean pore sizes desired in the various areas of the substrate, for fibers having an average diameter of about 10 microns it is believed that best results will be obtained if the ribs are made with fibers having an average length of between 2 and 7.5 mils and the web portions are made with carbon fibers having an average length of between 7.5 and 13 mils. Since the edge seals must have very small pores, they are preferably made from carbon fibers having an average length of less than 1 mil, and may even be made from carbon powder.

Porosity of the web portion and ribs of the substrate is also important. Maximum porosity is strength limited. Minimum required porosity in the web portion is diffusion limited in that the reactant gas must be distributed as uniformly as possible over the maximum amount of catalyst surface area both between and under the ribs. Minimum required porosity in the ribs is dictated by the required liquid storage volume. The preferred web porosity is between 67% and 81% while the preferred rib porosity is between 60% and 81%. Less than 60% porosity in the ribs is likely to require more rib volume than is consistent with the objective of keeping the electrodes as thin as possible. Note that while a difference in mean pore size as between the web portion and the ribs is critical, that is not the case when it comes to porosity. As for the edge seal, pore size and not porosity is important.

Commonly owned U.S. patent application Ser. No. 306,836 titled "Process For Fabricating Ribbed Electrode Substrates and Other Articles," filed on even date herewith and having the same inventive entity, describes a molding process which may be used to fabricate the substrates of the present invention from dry mixtures of carbon fibers and carbonizable resin. It is taught in that application substrates with different mean pore sizes in the webs, ribs, and edge seals may be molded from carbon fiber/resin molding mixtures in a single operation by using different mixtures in the various areas of the mold. More specifically, the different mixtures preferably have the same ratio of carbon fibers to resin; however, the bulk density of the fibers used in each mixture is different. Most preferably the different fiber bulk densities are obtained by using batches of fibers having different average fiber lengths and the same average fiber diameter. Relationships can be developed between (1) the bulk density of fibers used in a mixture; (2) compaction pressure used during molding; (3) as-molded density; and (4) finished product density. Relationships can also be developed between fiber bulk density and substrate mean pore size for given carbon fiber/resin ratios and fiber diameter. Thus, a wide variety of desired properties can be imparted to various portions of a substrate by selecting molding mixtures with the appropriate fiber bulk density for use in the appropriate areas of the molding die.

A series of trials was conducted by fabricating 5 in. by 5 in. flat plates from 30 gram samples of a variety of resin/carbon fiber blends having different fiber bulk densities and the same ratio of 30 weight percent resin to 70 weight percent carbon fiber. The fibers in all blends had the same average diameter. Different fiber bulk densities were obtained by using batches of fibers having different average carbon fiber lengths. For these trials the resin was a thermosetting resin having a melting point of about 150° F. The tests involved uniformly distributing each 30 gram sample mixture within a 5 in. by 5 in. mold and compacting the mixture by applying a known pressure for 3.0 minutes using a flat plate die while maintaining the mixture at a temperature of 300° F. during that time. Three (3.0) minutes was determined to be sufficiently long to result in sufficient curing of the resin such that when the pressure was removed the part retained its compacted thickness.

Figure 4:
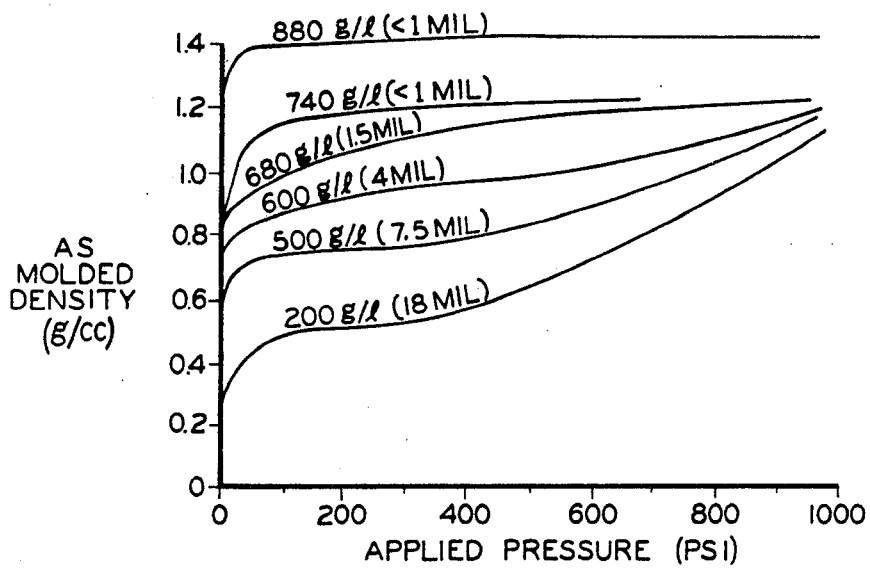
FIG. 4 is a graph showing the relationship of compaction pressure to the density of molded articles made from carbon fiber/resin mixtures of varying fiber bulk density.

Results of the tests are displayed on the graph of FIG. 4. The as-molded density of the sample is read off the vertical axis, and the applied compaction pressure is read off the horizontal axis. Each individual curve on the graph represents mixtures incorporating carbon fibers having the indicated bulk density in terms of gm/l. The average carbon fiber length used to obtain the indicated density is in parenthesis. Note that for fiber bulk densities of both 740 gm/l and 880 gm/l the average carbon fiber length is stated as less than 1.0 mil. Although the average carbon fiber lengths of these two samples were not characterized sufficiently to distinguish them quantitatively, mixtures with fibers having a bulk density of 880 gm/l did, of course, have an average carbon fiber length less than mixtures with fibers having a bulk density of 740 gm/l. The carbon fibers having a bulk density of 880 gm/l are very close to being particulate and probably have an average length to diameter ratio of between 1.0 and 2.0.

Figure 7:
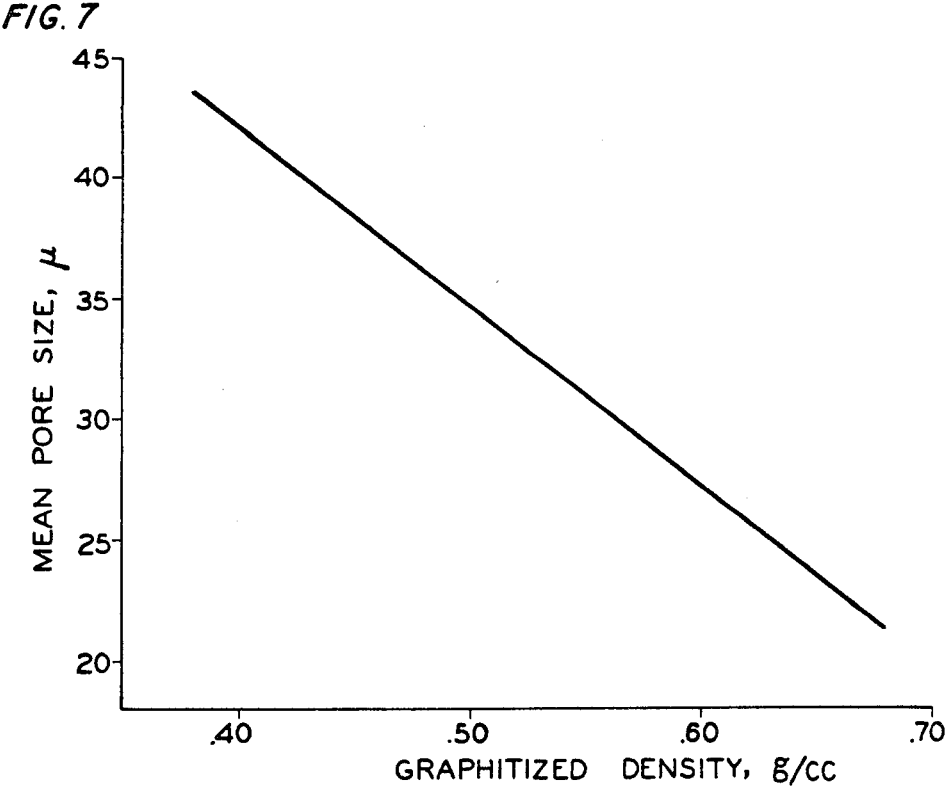
FIG. 7 is a graph showing the relationship between mean pore size of a graphitized carbon fiber/resin article and the density of that article.

FIG. 7 is a graph showing the relationship between the density and mean pore size of a graphitized plate with a range of densities between 0.38 g/cc and 0.68 g/cc. The plates were made from mixtures comprising 30 weight percent resin and 70 weight percent carbon fibers (fiber bulk density: 500 gm/l; average fiber length: 7.5 mils) by a method similar to the method for making the plates used in the tests described with respect to FIG. 4. To generate the curve of FIG. 7 compacting pressures were varied to obtain the different densities. Curves may also be generated showing the relationship between the bulk density of fibers and mean pore size of the finished article for fixed compacting pressure on a known initial volume of molding mixture.

Figure 3:
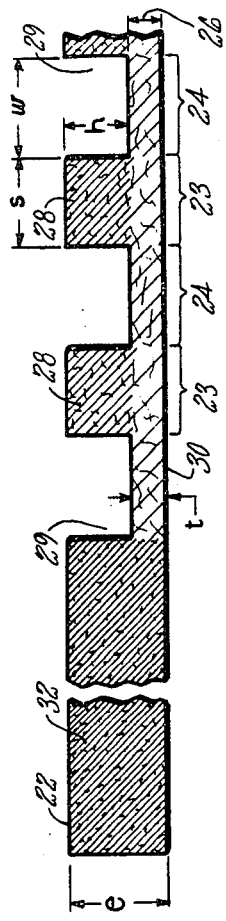
FIG. 3 is an enlarged cross-sectional view of the substrate shown in FIG. 2.

Referring to FIG. 3, one substrate according to the present invention has an unsupported web width w of 0.065 inch, a web or sheet thickness t of 0.025 inch, a rib and supported web width s of 0.055 inch, and a rib height h of 0.038 inch. The edge seals are 1.0 inch wide and have a thickness e of 0.063 inch, which is the sum of the rib height and the web portion thickness. The finished part has unsupported webs with a density of 0.57 gm/cm$^3$, a porosity of 74%, and mean pore size of 29.4$\mu$. The supported webs have a density of 0.52 gm/cm$^3$, porosity of 77%, and mean pore size of 34.0$\mu$. The ribs have a density of 0.69 gm/cm$^3$, porosity of 69%, and mean pore size of 20$\mu$. Finally, the edge seals have a density of 1.2 gm/cm$^3$ and mean pore size of 8.0$\mu$.

To fabricate such a substrate, three different molding compounds are prepared, all comprising 30%, by weight, of Reichhold Varcum ® phenolic resin (grade 24-655) and 70%, by weight, pitch based carbon fibers having a nominal solid density of 2.0 gm/cc and a nominal diameter of about 10 microns. The carbon fibers for the compounds are chopped into three different batches each having a different average fiber length using a Wiley mill or equivalent. The batch used for the web molding compound (i.e., the sheet 26) has an average fiber length of 7.5 mils; the batch for the rib molding compound has an average fiber length of 4.0 mils; and the batch for the edge seal molding compound has an average fiber length of less than 1.0 mil. The dry phenolic resin powder is mixed with each of these batches of carbon fibers in a blender for 3 to 5 minutes. The fiber lengths are chosen to provide each of the different compounds with fibers having bulk densities which will ultimately result in the finished substrate having the desired properties in the various areas. In this example fibers having a bulk density of 500 gm/l are used in the web molding compound; fibers having a bulk density of 600 gm/l are used in the rib molding compound; and fibers having a bulk density of 880 gm/l are used in the seal molding compound. Note that these compounds correspond to curves appearing in FIG. 4.

Figure 5:
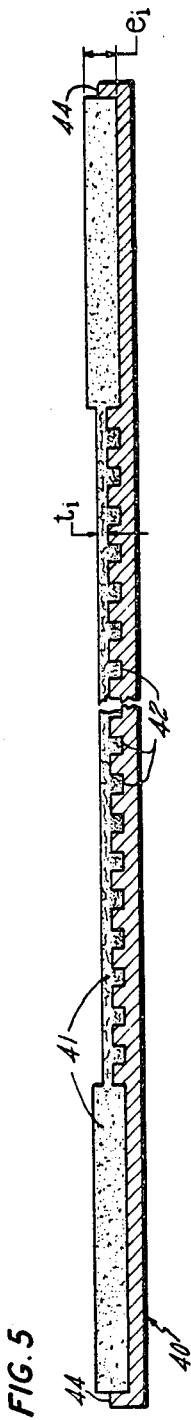
FIG. 5 is an illustrative cross-sectional view of a portion of a mold die filled with molding compounds for fabricating electrode substrates of the present invention.

The compounds are deposited into the appropriate area of a room temperature mold having an inverse image of the part to be formed. Such a mold 40 is shown in cross section in FIG. 5 filled with the molding materials 41 prior to the step of heating and compacting. In this example the rib forming portion or grooves 42 of the mold 40 would be filled first by sifting the rib molding compound into the grooves 42. A slight excess of material is preferably deposited and lightly compacted into the grooves using, for example a doctor blade, to assure there are no voids within the grooves. The initial bulk density of the rib material is nearly the same as the bulk density of the fibers used therein; and the light compacting increases its density from about 600 gm/l to about 700 gm/l. The edge seal molding compound and web molding compound are then sifted into the mold. The seal compound is deposited to a thickness or height $e_i$ of 0.105 inch; and the web compound is deposited to a thickness $t_i$ of 0.035 inch.

The filled die is then placed between platens heated to 300° F., and the molding material is compacted between them. The top surface 44 of the mold 40 acts as a shim such that the material is compacted to the desired overall substrate thickness of 0.063 inch. Within a few seconds the temperature of the molding compounds increases to approximately the same temperature as the press platens. The molding pressure and temperature are held for 3.0 minutes and then released. The molding compounds retain their compacted thickness. For this example it is estimated that during compaction the rib and supported web material will receive a pressure of less than 10 psi; and the unsupported web material and edge seal material a pressure of about 50 psi.

Figure 6:
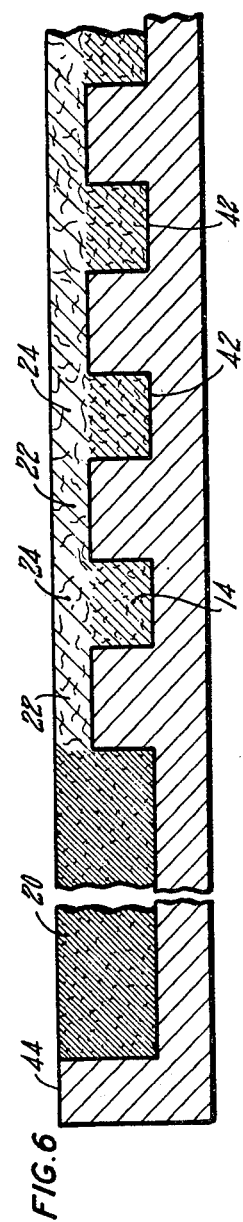
FIG. 6 is a cross-sectional view of the mold of FIG. 5 after heating and compacting the molding material.

FIG. 6 shows the molding compounds in the mold 40 after the pressure has been removed. The different cross hatchings represent areas of different molded densities. The as-molded densities of these areas is as follows: edge seals 32, 1.4 gm/cm$^3$; unsupported webs 24, 0.66 gm/cm$^3$; supported webs 23, 0.60 gm/cm$^3$; and ribs 28, 0.80 gm/cm$^3$.

After compaction the part is removed from the mold. The as-molded part is then carbonized in an inert atmosphere by increasing the temperature at an approximate rate of 40° C. per hour to 950° C. It is held at 950° C. for about 1.0 hour. At this point essentially all the resin had been converted to carbon. The part is then further heated to 2800° C. to convert the carbon to graphite-like material. The finished substrate will now have the characteristics previously indicated.

Although the invention has been shown and described with respect to a preferred embodiment thereof, it should be understood by those skilled in the art that other various changes and omissions in the form and detail thereof may be made therein without departing from the spirit and the scope of the invention.

We claim:

1. An electrochemical cell electrode substrate, said substrate comprising, by weight, 65%–90% carbon fibers and 10%–35% polymeric carbon, said substrate including a flat sheet portion having parallel ribs extending outwardly from and being integral with one side thereof forming parallel channels extending across said substrate, said flat sheet portion having a mean pore size of 25–45 microns and said ribs having a mean pore size 60–75% of said flat sheet portion mean pore size.

2. The electrode substrate according to claim 1 wherein the ratio of carbon fibers to polymeric carbon is essentially constant throughout said substrate.

3. The electrode substrate according to claim 1 wherein said substrate includes edge seal portions contiguous with each edge of said flat sheet portion parallel to said ribs, said seal portions having a mean pore size no greater than about 10 microns.

4. The electrode substrate according to claim 1, wherein said flat sheet portion has a porosity of 67% to 81% and said ribs have a porosity of 60% to 81%.

5. The electrode substrate according to claim 4 wherein the average length of carbon fibers throughout said flat sheet portion is greater than the average length of carbon fibers throughout said ribs.

6. The electrode substrate according to claim 5 wherein the average carbon fiber diameter throughout said flat sheet portion is the same as the average carbon fiber diameter throughout said ribs and is less than 20 microns.

7. The electrode substrate according to claim 3 or 4 wherein the average carbon fiber diameter throughout said flat sheet portion and throughout said ribs is less than 20 microns, the average carbon fiber length throughout said flat sheet portion is 7.5–13.0 mils, and the average carbon fiber length throughout said ribs is 2.0–7.5 mils.

8. The electrode substrate according to claim 4 wherein the mean pore size of said flat sheet portion is between 25 and 35 microns.

9. The electrode substrate according to claim 3 wherein the average carbon fiber length in said seal portions is no greater than about 1.0 mil.

10. The electrode substrate according to claim 7 wherein said average fiber diameter in said ribs and flat sheet portion is about 10 microns.

11. A fuel cell electrode substrate, said substrate comprising, by weight, 65%–90% carbon fibers and 10%–35% polymeric carbon, the ratio of carbon fibers to polymeric carbon being essentially constant throughout said substrate, said substrate including a flat sheet portion and a plurality of parallel ribs, said ribs extending outwardly from and being integral with one side of said sheet portion forming parallel channels extending across said substrate, said substrate also including edge seal portions contiguous with each edge of said flat sheet portion parallel to said ribs, said flat sheet portion having a mean pore size of 25–45 microns, said ribs having a mean pore size 60%–75% of said flat sheet portion mean pore size, and said seal portions having a mean pore size no greater than about 10 microns, wherein said flat sheet portion has a porosity of 67% to 81% and said ribs have a porosity of 60% to 81%, the average length of carbon fibers throughout said flat sheet portion being greater than the average length of carbon fibers throughout said ribs, and the average length of carbon fibers throughout said ribs being greater than the average length of carbon fibers throughout said seal portions.

12. The substrate according to claim 11 wherein the average carbon fiber diameter is the same in said flat sheet portion, said ribs, and said seal portions and is less than 20 microns, the average carbon fiber length throughout said flat sheet portion is 7.5–13.0 mils, the average carbon fiber length throughout said ribs is 2.0–7.5, and the average carbon fiber length throughout said edge seal portions is less than 1.0 mil.

13. The substrate according to claim 12 wherein said average carbon fiber diameter is about 10 microns.

14. The electrode substrate according to claim 11 or 12 having a layer of catalyst disposed on the side of said sheet portion opposite said ribs.

15. An electrochemical cell comprising an anode electrode, a cathode electrode, and a matrix layer sandwiched therebetween for holding electrolyte liquid, each of said electrodes including a substrate comprising, by weight, 65%–90% carbon fibers and 10%–35% polymeric carbon, said substrate including a flat sheet portion and parallel ribs extending outwardly from and being integral with a side of said sheet portion facing away from said matrix layer forming parallel channels extending across said substrate, said flat sheet portion having a mean pore size of 25–45 microns and having a catalyst layer disposed on the side thereof facing the matrix layer and in contact therewith, wherein said ribs have a mean pore size 60–75% of said flat sheet portion means pore size.

16. The electrochemical cell according to claim 15 wherein the ratio of carbon fibers to polymeric carbon is essentially constant throughout said substrate.

17. The electrochemical cell according to claim 15 or 16, wherein said substrate includes edge seal portions contiguous with each edge of said flat sheet portion parallel to said ribs, said edge seal portions having a surface in contact with said matrix layer along the length of said substrate in the direction of said ribs, said edge seal portions having a mean pore size no greater than about 10 microns and said matrix layer having a mean pore size less than the mean pore size of said edge seal portions.

18. The electrochemical cell according to claim 17 wherein the average length of carbon fibers throughout said flat sheet portion of said substrate is greater than the average length of carbon fibers throughout said ribs of said substrate, and the average length of carbon fibers throughout said edge seal portions is less than the average length of carbon fibers throughout said ribs.

19. The electrochemical cell according to claim 18 wherein said flat sheet portion of each substrate has a porosity of 67% to 81% and said ribs have a porosity of 60% to 81%.

20. The electrochemical cell according to claim 19 wherein the average carbon fiber diameter throughout said substrates is less than 20 microns, the average carbon fiber length throughout said flat sheet portion is 7.5–13.0 mils, the average carbon fiber length throughout said ribs is 2.0–7.5 mils, and the average carbon fiber length throughout said seal portions is less than 1.0 mil.

21. An electrochemical cell electrode comprising a substrate and a catalyst layer, said substrate comprising, by weight, 65%–95% carbon fibers and 10%–35% polymeric carbon, said substrate including a flat sheet portion, said catalyst layer being disposed on one side thereof, said substrate including parallel ribs extending outwardly from and being integral with the other side of said sheet portion forming parallel channels extending across said substrate, said flat sheet portion having a mean pore size of 25–45 microns and said ribs having a mean pore size 60%–75% of said flat sheet portion mean pore size.

* * * * *

UNITED STATES PATENT AND TRADEMARK OFFICE
CERTIFICATE OF CORRECTION

PATENT NO. : 4,374,906
DATED : February 22, 1983
INVENTOR(S) : GLEN J. GOLLER and RICHARD D. BREAULT It is certified that error appears in the above-identified patent and that said Letters Patent is hereby corrected as shown below:

Column 1, between lines 4 and 5, insert: "The Government has rights in this invention pursuant to Contract No. DE-AC03-77ET11302 awarded by the Department of Energy".

Column 2, line 24: "Pat. No. 5,115,528" should be --Pat. No. 4,115,528--.

Column 7, line 64: Delete "and having the same inventive entity,".

Signed and Sealed this

Twenty-eighth Day of June 1983

[SEAL]

Attest:

GERALD J. MOSSINGHOFF

Attesting Officer  Commissioner of Patents and Trademarks